(No Model.) 5 Sheets—Sheet 4.

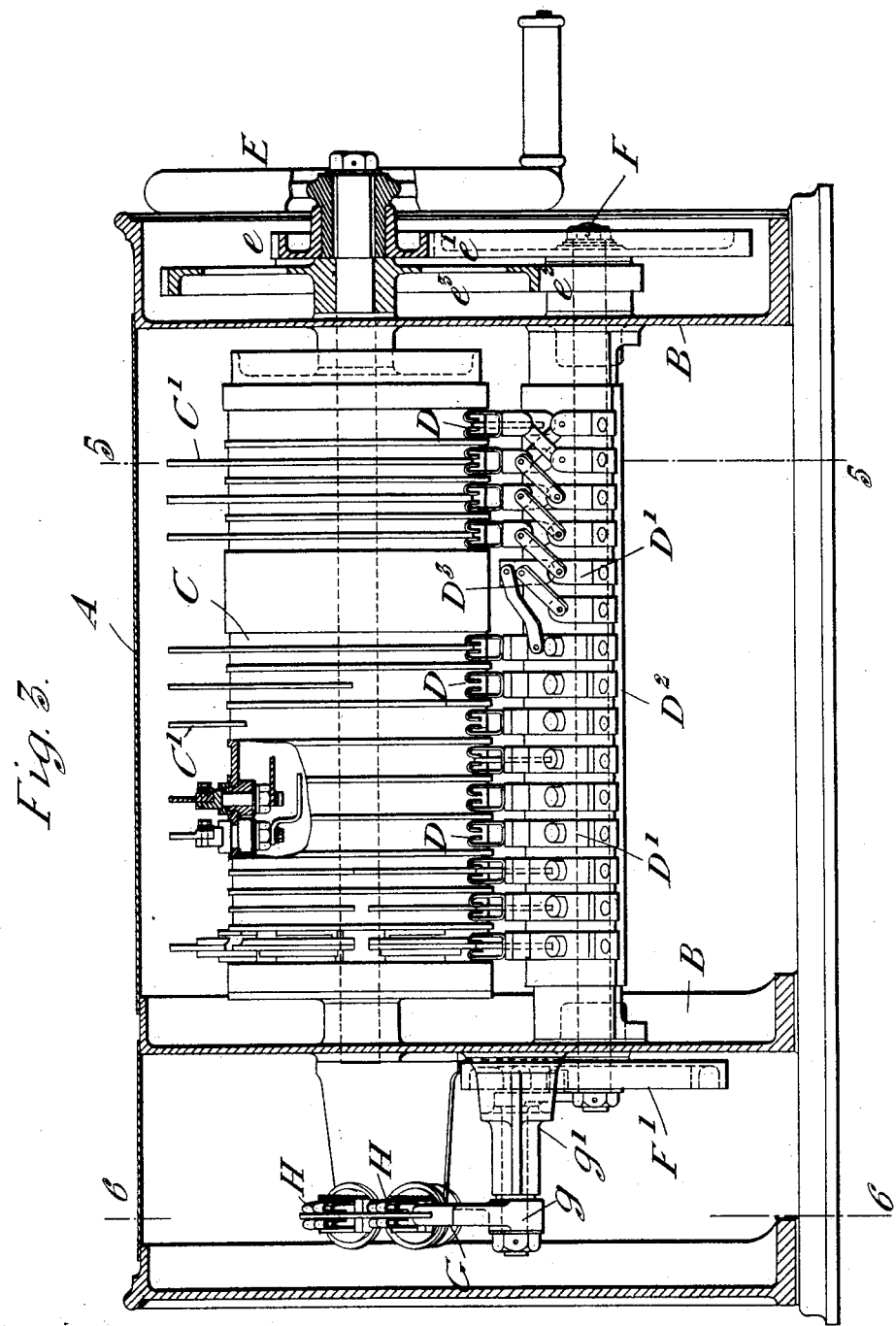

A. J. STOPHER.
APPARATUS FOR CONTROLLING ELECTRIC MOTORS.

No. 602,781. Patented Apr. 19, 1898.

(No Model.) 5 Sheets—Sheet 5.
A. J. STOPHER.
APPARATUS FOR CONTROLLING ELECTRIC MOTORS.
No. 602,781. Patented Apr. 19, 1898.
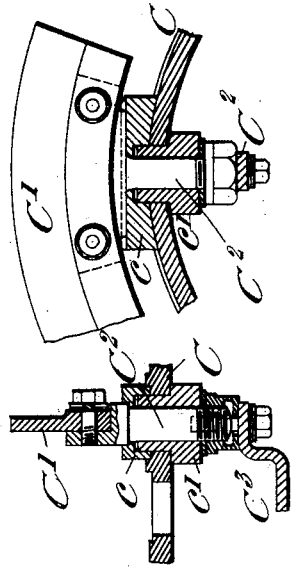
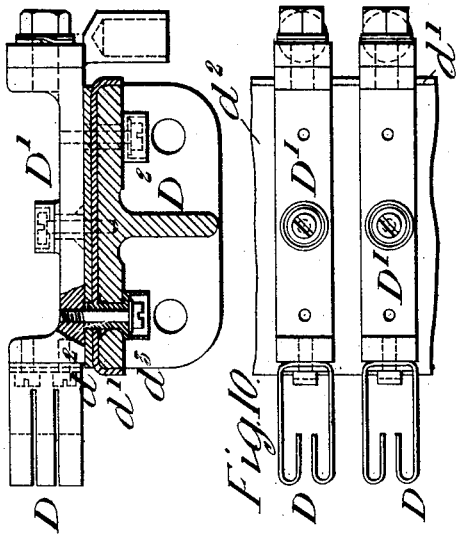
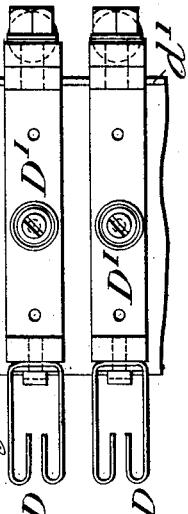
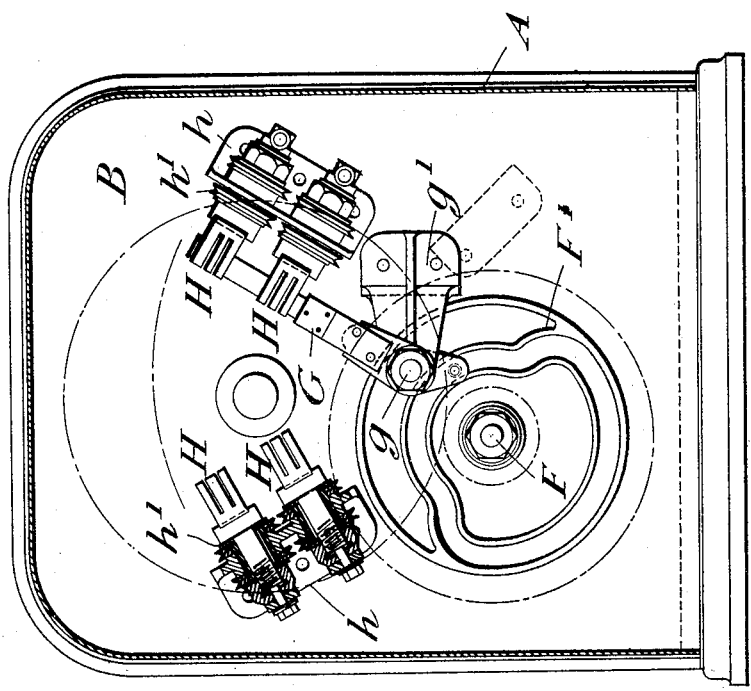
Witnesses
Inventor
Arthur J. Stopher
By James L. Norris
Atty

UNITED STATES PATENT OFFICE.

ARTHUR JAMES STOPHER, OF LONDON, ENGLAND, ASSIGNOR TO THE SIEMENS BROTHERS & COMPANY, LIMITED, OF SAME PLACE.

APPARATUS FOR CONTROLLING ELECTRIC MOTORS.

SPECIFICATION forming part of Letters Patent No. 602,781, dated April 19, 1898.

Application filed February 16, 1898. Serial No. 670,556. (No model.)

*To all whom it may concern:*

Be it known that I, ARTHUR JAMES STOPHER, a citizen of England, residing at 47 Elliscombe road, Old Charlton, London, in the county of Kent, England, have invented a new and useful Apparatus for Controlling Electric Motors, of which the following is a specification.

Electric locomotives having more than one motor require for the starting of their motors a series of operations to direct the electric current in such a way as to introduce and cut out resistances and to work the motors first in series and then in parallel. Thus when, for instance, there are two motors, the current is first directed through the resistance and the motors in series; secondly, the resistance is cut out, the motors still being connected in series; thirdly, the resistance is again introduced and one of the motors is short-circuited; fourthly, the current flows through the resistance and both motors in parallel, and, finally, the resistance is cut out and the motors continue in parallel.

Now this invention relates to apparatus whereby operations such as are above indicated are automatically determined to occur in proper sequence, the operator having only to move a suitable handle.

The apparatus is also arranged to prevent sparking at those parts which might be injured, the sparking being confined to a suitable sparking-switch.

I shall describe my invention, by way of example, as applied to two electric motors, referring to the accompanying diagrams and drawings.

Figure 1:
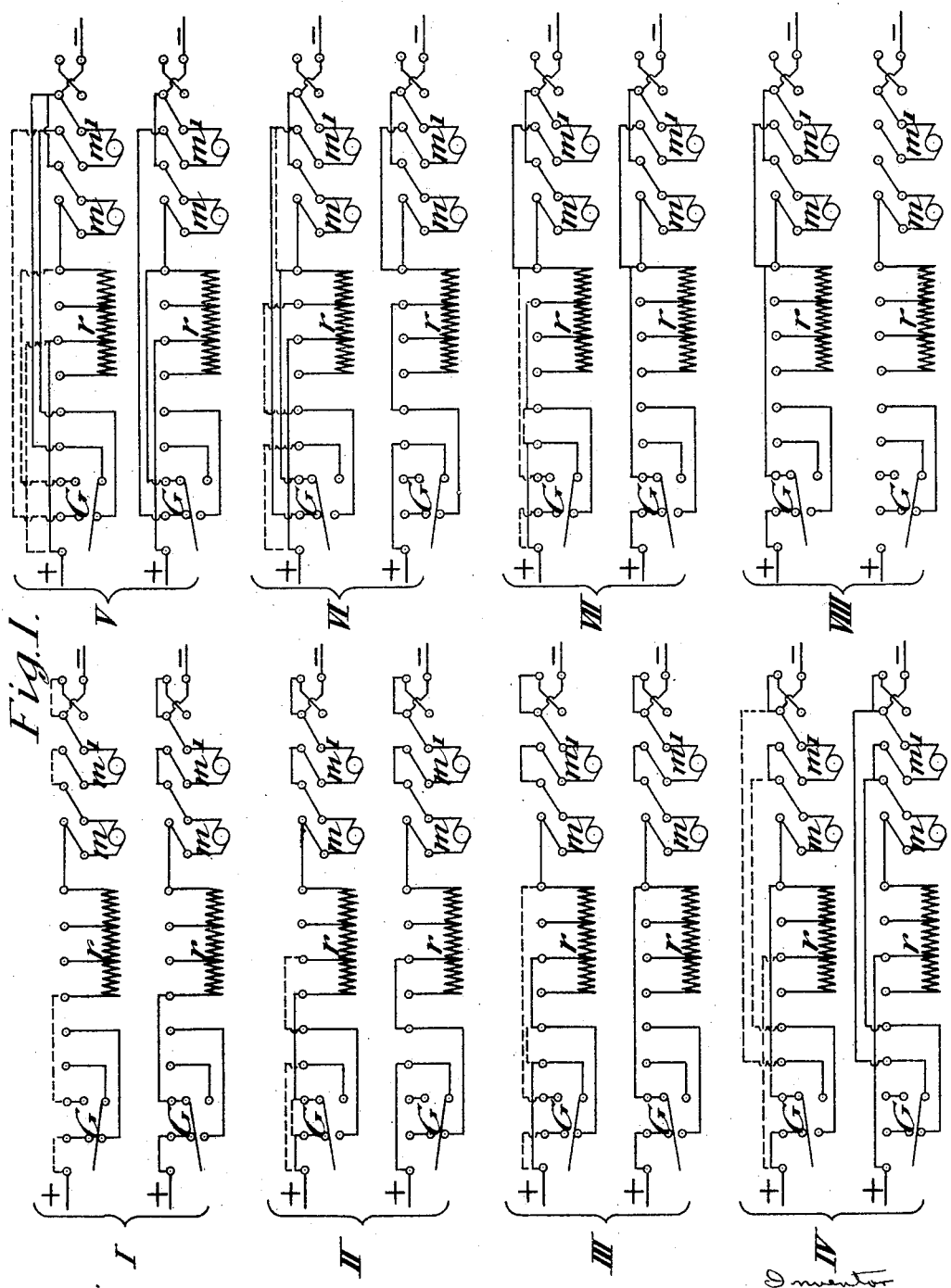
Figure 2:
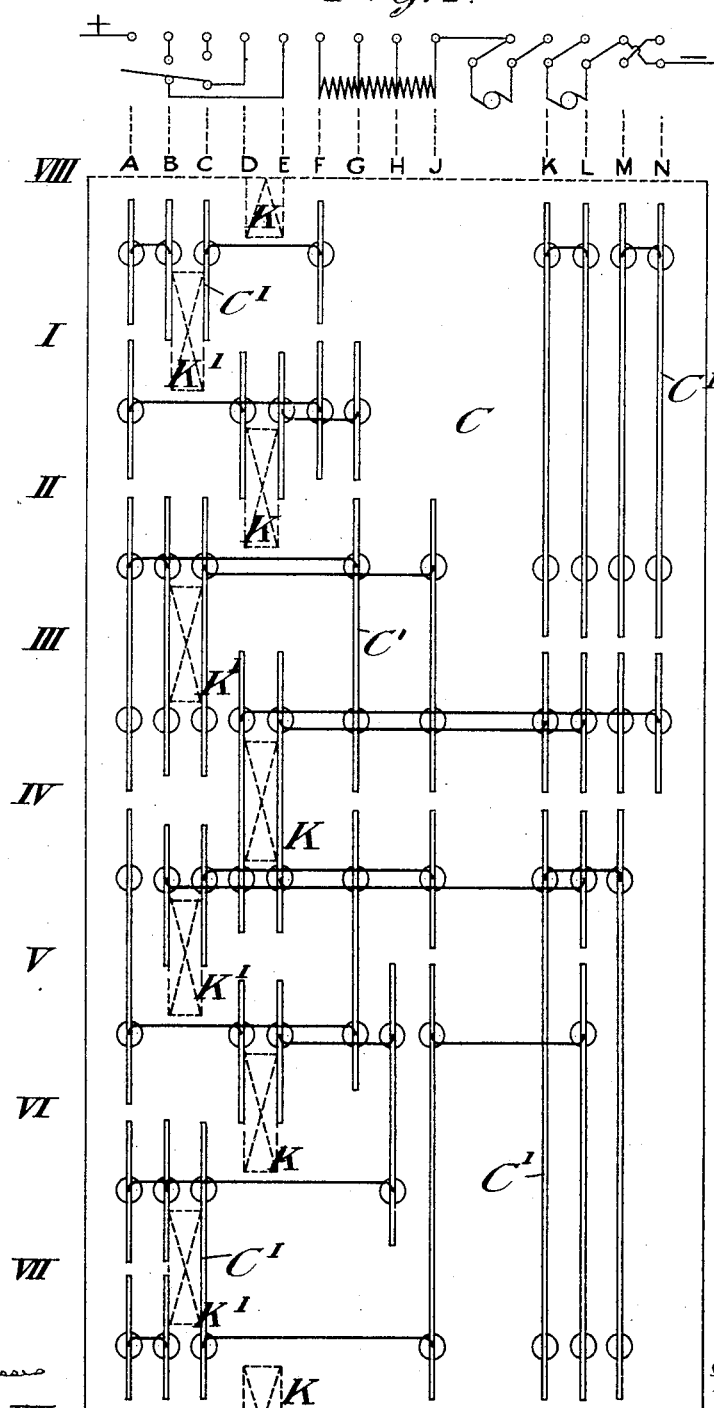
Figure 5:
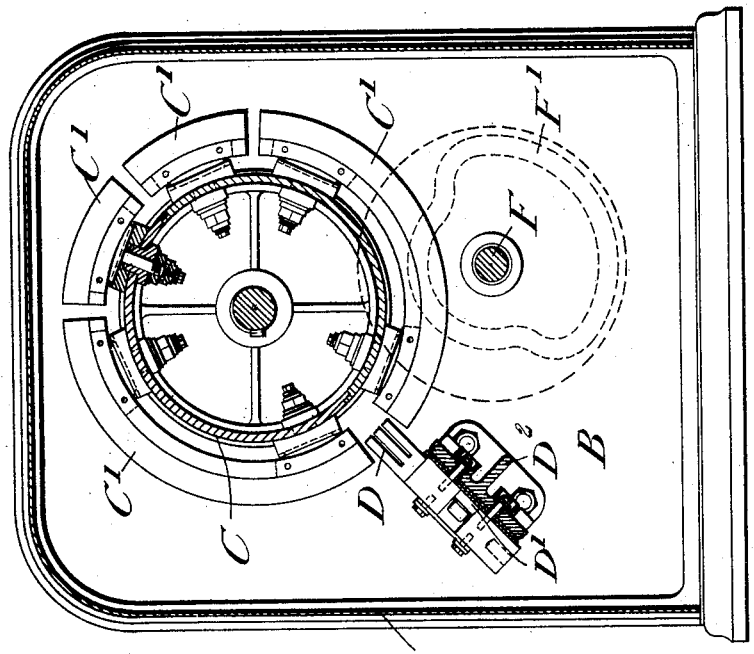
Figure 4:
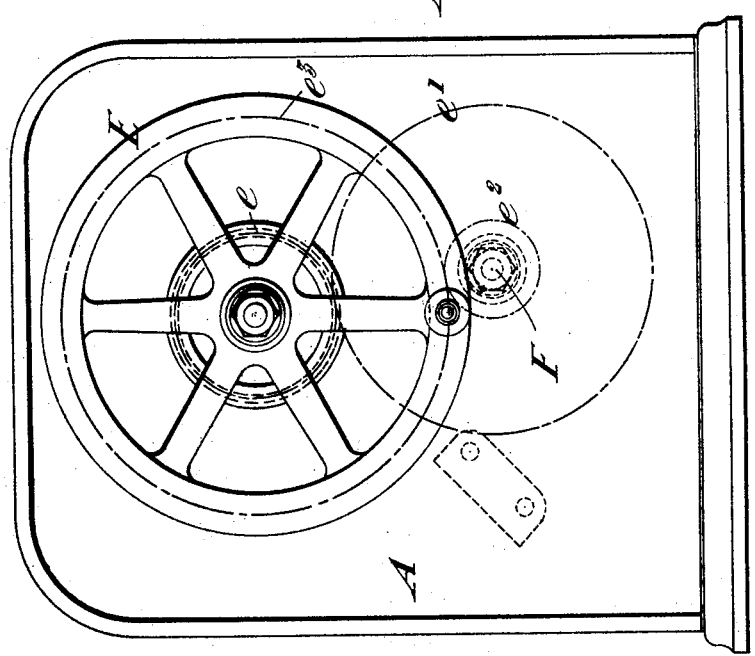

Figure 1 is a diagram indicating eight successive electrical connections determined by the apparatus. Fig. 2 is a diagram showing development of the commutating-cylinder, with the conducting-segments and connection as arranged thereon. Fig. 3 is a longitudinal section of the apparatus. Fig. 4 is an end elevation. Figs. 5 and 6 are transverse sections respectively on the lines 5 5 and 6 6 of Fig. 3. Figs. 7 and 8 are respectively part longitudinal and transverse sections, to an enlarged scale, showing the fixing of the commutator-segments. Fig. 9 is a transverse section; and Fig. 10 is a part side elevation, showing the contacts for the commutator-segments.

Referring first to Figs. 3 to 10, inclusive, A is a closed casing, within which is mounted in bearings on frames B a commutating-cylinder C, having fixed upon it a number of conducting-segments C'. These, as shown more particularly in Figs. 7 and 8, are insulated from the cylinder by insulators $c$ $c'$. Also the stems $C^2$, by which the segments are held, have, where required, attached to them conductors $C^3$, by which they are electrically connected to others of the segments. The segments C', as the cylinder revolves, as will hereinafter be described, pass between conducting-springs D, fixed to metal straps D' on a girder $D^2$, which is attached to the framing B; but the straps D' are insulated from the girder by insulators $d'$, $d^2$, and $d^3$. Some of the straps D' are electrically connected to others of them by diagonal bars $D^3$. The cylinder C is driven at a slow speed by a handwheel E through gearing $e$ $e'$ $e^2$ $e^3$, $e$ being a pinion on the hand-wheel, $e'$ and $e^2$ being a wheel and pinion on a counter-shaft F, and $e^3$ being a wheel on the shaft of the cylinder C. On the counter-shaft F is fixed a cam F', which in each revolution causes an arm G, pivoted at $g$ to a bracket $g'$, fixed to the framing B, to make a stroke from right to left and from left to right, resting for a time in each position between contact-springs H, which are fixed on brackets $h$, being insulated therefrom by insulators $h'$. By the gearing $e$ $e'$ the counter-shaft F and its cam F' make one revolution for two revolutions of the handwheel, and by the gearing $e^2$ $e^3$ the commutating-cylinder makes one revolution for four of the counter-shaft F, and therefore for eight of the hand-wheel E.

Referring now to Fig. 2, showing the circumference of the commutating-cylinder and the segments C thereon developed, the positions of the switch-arm G to the right or left are indicated by the dotted crossed rectangles K and K', respectively, and the top diagram indicates the condition of the circuits when the motors are at rest, this diagram corresponding with the last in VIII of Fig. 1.

Referring now to Fig. 1, which shows eight different conditions of the circuits, in each case with a preparatory condition, *r* indicating resistances, and *m m'* the two motors, and the dotted lines in the upper figures indicating paths prepared for the current when the switch-arm G shall be moved over. The lower figures in each of the eight diagrams show the paths for the current completed when the switch-arm G is moved over. The eight conditions of the circuits are therefore as follows:

I. All the resistances are in circuit and the motors are in series.

II. Part of the resistance is cut out.

III. All the resistance is cut out.

IV. Part of the resistance is again introduced and the second motor is short-circuited.

V. The motors are connected in parallel.

VI. Part of the resistance is cut out.

VII. All the resistance is cut out.

VIII. The circuit is open, stopping the motors.

As in no case is there complete interruption of the circuit on the commutator, there is no sparking between any of the segments C and springs D. When any sparking occurs, it is only at the switch as the arm G leaves the contact-springs H.

Although I have described the apparatus as applied to two motors, obviously by employing suitable numbers of commutator-segments and resistances suitably arranged three or more motors might be similarly controlled.

It is convenient to connect a visible index to the commutating-cylinder, so that the operator may at any time see its position. Also it is convenient, though not necessary, that the hand-wheel should be geared to the cylinder in the proportion of eight to one, because the operator knows that by each turn of his handle he completes a change of circuit. In cases where a greater or less number of changes of circuit are required the gearing would be by preference arranged to correspond with the number of changes.

Having thus described the nature of this invention and the best means I know for carrying the same into effect, I claim—

1. In an apparatus for controlling electric motors, the combination of a rotatable cylinder provided with contact-segments arranged circumferentially thereon, spring-contacts mounted on a fixed support and arranged to be periodically engaged by the contact-segments on the rotatable cylinder, means for rotating the cylinder, and a switch comprising two independent series of oppositely-arranged fixed spring-contacts, a pivoted switch-arm, and a cam geared to revolve with the cylinder and operating to oscillate said switch-arm to alternately contact with said series of spring-contacts, substantially as described.

2. In an apparatus for controlling electric motors, the combination of a rotatable cylinder provided with contact-segments arranged circumferentially thereon, spring-contacts arranged to be periodically engaged by the contact-segments on the rotatable cylinder, means for rotating the cylinder, and a switch comprising two series of contacts, a pivoted switch-arm, and a cam geared to revolve with the cylinder and operating to oscillate said switch to cause the latter to alternately contact with said series of contacts, the relative arrangement of the contact-segments and the oscillating switch being such that the circuit for each succeeding operation on the motors is prepared but not completed till the switch has made a corresponding stroke, substantially as described.

In testimony whereof I have signed my name to this specification, in the presence of two subscribing witnesses, this 15th day of December, A. D. 1897.

ARTHUR JAMES STOPHER.

Witnesses:
FRANK ALLINSON,
GEORGE BOLLAND WINKFIELD.